US012518562B2

United States Patent
Chen et al.

(10) Patent No.: US 12,518,562 B2
(45) Date of Patent: Jan. 6, 2026

(54) ACCESS CONTROL WITH FACE RECOGNITION AND HETEROGENEOUS INFORMATION

(71) Applicant: ASSA ABLOY AB, Stockholm (SE)

(72) Inventors: Jianbo Chen, Cedar Park, TX (US); Kapil Sachdeva, Round Rock, TX (US); Sylvain Jacques Prevost, Austin, TX (US)

(73) Assignee: ASSA ABLOY AB, Stockholm (SE)

( * ) Notice: Subject to any disclaimer, the term of this patent is extended or adjusted under 35 U.S.C. 154(b) by 334 days.

(21) Appl. No.: 18/247,184

(22) PCT Filed: Oct. 12, 2020

(86) PCT No.: PCT/EP2020/078642
§ 371 (c)(1),
(2) Date: Mar. 29, 2023

(87) PCT Pub. No.: WO2022/078572
PCT Pub. Date: Apr. 21, 2022

(65) Prior Publication Data
US 2023/0368575 A1    Nov. 16, 2023

(51) Int. Cl.
*G06V 40/16* (2022.01)
*G06V 10/80* (2022.01)
*G07C 9/00* (2020.01)
*G07C 9/37* (2020.01)

(52) U.S. Cl.
CPC .......... *G06V 40/172* (2022.01); *G06V 10/809* (2022.01); *G07C 9/00563* (2013.01); *G07C 9/37* (2020.01)

(58) Field of Classification Search
CPC .... G06V 40/172; G06V 10/809; G06V 20/52; G07C 9/00563; G07C 9/37; G06F 18/253
See application file for complete search history.

(56) References Cited

FOREIGN PATENT DOCUMENTS

| CN | 107358079 | 11/2017 |
|----|-----------|---------|
| CN | 108875514 | 11/2018 |
| CN | 109117808 | 1/2019 |
| CN | 109993102 | 7/2019 |
| CN | 110826525 | 2/2020 |
| CN | 111611849 | 9/2020 |
| CN | 116569226 | 8/2023 |

(Continued)

OTHER PUBLICATIONS

English translation of Linbin (CN-111611849) (Year: 2020).*

(Continued)

*Primary Examiner* — Wassim Mahrouka
(74) *Attorney, Agent, or Firm* — Schwegman Lundberg & Woessner, P.A.

(57) ABSTRACT

The use of multimodal face attributes in facial recognition systems is described. In addition, use of one or more auxiliary attributes, such as a temporal attribute, can be used in combination with visual information to improve the face identification performance of a facial recognition system. In some examples, the use of multimodal face attributes in facial recognition systems can be combined with the use of one or more auxiliary attributes, such as a temporal attribute. Each of these techniques can improve the verification performance of the facial recognition system.

20 Claims, 6 Drawing Sheets

(56) References Cited

FOREIGN PATENT DOCUMENTS

| CN | 116569226 B | 6/2025 |
|---|---|---|
| JP | 2012003623 | 1/2012 |
| WO | 2017107957 | 6/2017 |
| WO | 2022078572 | 4/2022 |

OTHER PUBLICATIONS

"International Application Serial No. PCT EP2020 078642, International Preliminary Report on Patentability mailed Apr. 27, 2023", 13 pgs.
"European Application Serial No. 20792351.7, Communication Pursuant to Article 94(3) EPC mailed Mar. 13, 2024", 6 pgs.
"European Application Serial No. 20792351.7, Response Filed Apr. 5, 2024 to Communication Pursuant to Article 94(3) EPC mailed Mar. 13, 2024", 4 pgs.
"Chinese Application Serial No. 202080106094.4, Office Action mailed Apr. 30, 2024", with English translation, 22 pages.
U.S. Appl. No. 17/648,212, filed Jan. 18, 2022, Access Control With Face Recognition and Heterogeneous Information.
"Chinese Application Serial No. 202080106094.4, Office Action mailed Dec. 27, 2024", with English translation, 23 pages.
"Chinese Application Serial No. 202080106094.4, Response filed Feb. 14, 2025 to Office Action mailed Dec. 27, 2024", with English claims, 29 pages.
"Chinese Application Serial No. 202080106094.4, Response filed Mar. 20, 2025 to Consultation by Telephone In Person—Response Needed mailed Mar. 12, 2025", with English claims, 7 pages.
"Chinese Application Serial No. 202080106094.4, Response Filed Aug. 7, 2024 to Office Action mailed Apr. 30, 2024", with English claims, 6 pages.
"Chinese Application Serial No. 202080106094.4, Office Action mailed Sep. 24, 2024", with English translation, 15 pages.
"Chinese Application Serial No. 202080106094.4, Response Filed Nov. 20, 2024 to Office Action mailed Sep. 24, 2024", with English claims, 12 pages.
"International Application Serial No. PCT EP2020 078642, International Search Report mailed Jun. 23, 2021", 5 pgs.
"International Application Serial No. PCT EP2020 078642, Written Opinion mailed Jun. 23, 2021", 11 pgs.
Busch, C, "Towards a more secure border control with 3D face recognition", Proceedings of the 5th Norsk Informasjons Sikkerhets Konferanse (NISK), (Nov. 19, 2012), 49-60.
Hsin-Chun, Tsai, "Long distance person identification using height measurement and face recognition", TENCON 2009—2009 IEEE Region 10 Conference, IEEE, Piscataway, NJ, USA, (Jan. 23, 2009), 1-4.
Li, Wei, "Learning and Fusing Multimodal Features from and for Multi-task Facial Computing", arXiv preprint, https: arxiv.org pdf 1610.04322.pdf, (Oct. 14, 2016), 8 pgs.
Mulla, Mohammadjaved R, "Facial image based security system using PCA", International Conference on Information Processing (ICIP), IEEE, (Dec. 16-19, 2015), 548-553.
"European Application Serial No. 20792351.7, Communication Pursuant to Article 94(3) EPC mailed May 30, 2025", 6 pgs.
"European Application Serial No. 20792351.7, Response filed Sep. 16, 2025 to Communication Pursuant to Article 943 EPC mailed May 30, 2025", 61 pages.

\* cited by examiner

ACCESS CONTROL WITH FACE RECOGNITION AND HETEROGENEOUS INFORMATION

RELATED APPLICATION

This application is a U.S. National Stage filing under 35 U.S.C. § 371 of PCT Patent Application No. PCT/EP2020/078642, filed on Oct. 12, 2020, which application is incorporated herein by reference in its entirety.

FIELD OF THE DISCLOSURE

This document pertains generally, but not by way of limitation, to facial recognition systems and methods.

BACKGROUND

Image classification technologies (e.g., facial classification technologies) have multiple use cases. Example use cases include allowing authorized persons (and disallowing unauthorized persons) to enter a secure physical location, authenticating a user of an electronic device or identifying an object (e.g., as a chair, a table, etc.). One problem with some implementations of image classification technology is a high rate of incorrect identification by a trained image classification neural network.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

SUMMARY OF THE DISCLOSURE

Figure 1:
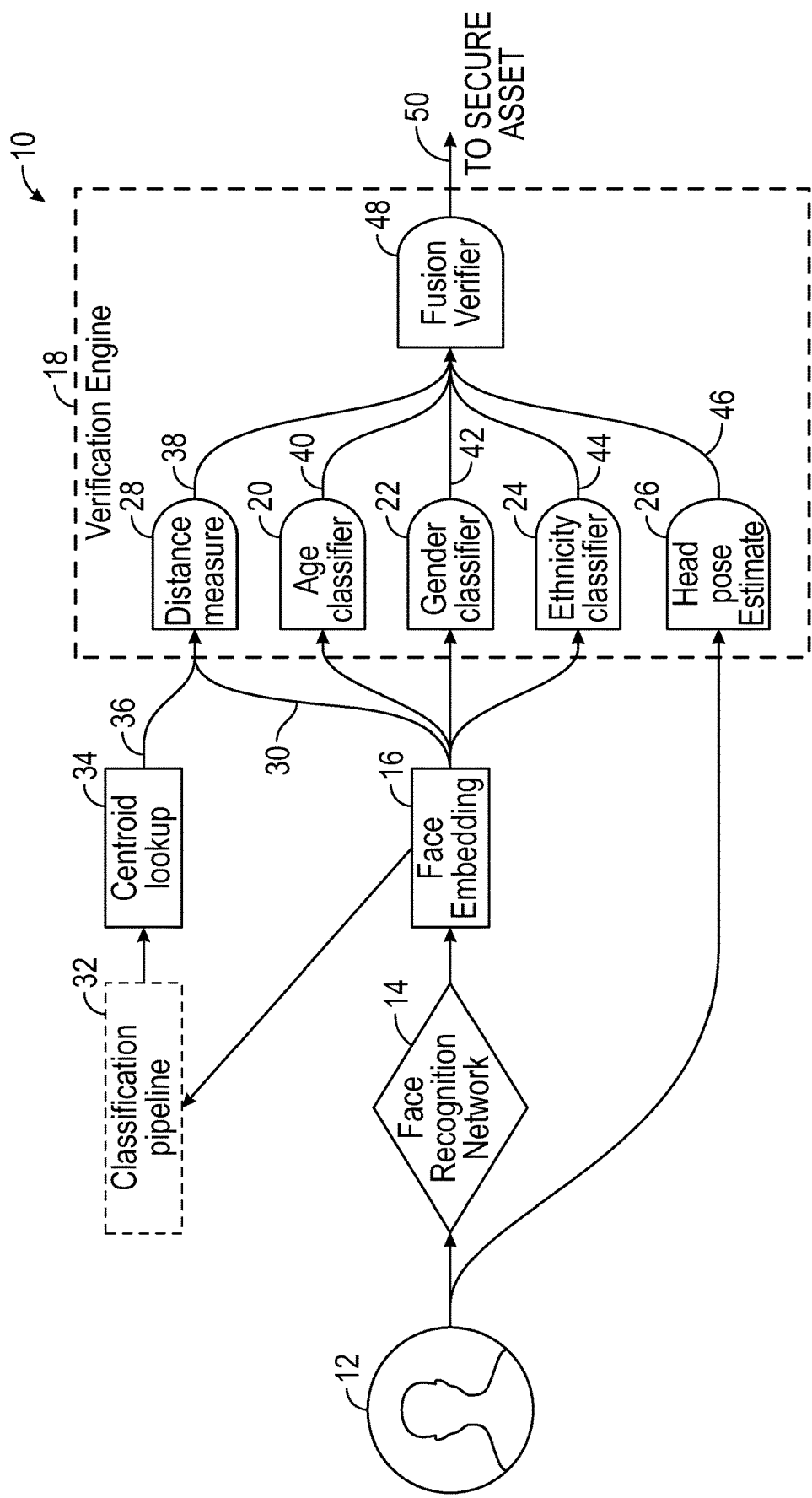
FIG. 1 is a conceptual diagram illustrating an example of a facial recognition system that uses multimodal face attributes.

This disclosure describes the use of multimodal face attributes in facial recognition systems. In addition, use of one or more auxiliary attributes, such as a temporal attribute, can be used in combination with visual information to improve the face identification performance of a facial recognition system. In some examples, the use of multimodal face attributes in facial recognition systems can be combined with the use of one or more auxiliary attributes, such as a temporal attribute. Each of these techniques can improve the verification performance of the facial recognition system.

In some aspects, this disclosure is directed to a computer-implemented method of using a facial recognition system to identify a person, the method comprising: extracting an attribute of the person by applying a first representation of a first image of the person to a previously trained attribute classifier machine learning model to generate an attribute classifier output; applying the attribute classifier output and a distance measurement output generated using a second representation of a second image of the person to a previously trained fusion verification machine learning model; generating a facial recognition system output using the previously trained fusion verification machine learning model; and controlling access to a secure asset using the facial recognition system output.

In some aspects, this disclosure is directed to a computer-implemented method of using a facial recognition system to identify a person from an image of the person, the method comprising: performing a face embedding; applying the face embedding to a classification pipeline to identify a similar image; generating a classification pipeline output based on the identified image; applying the classification pipeline output to a joint classification model; applying an auxiliary attribute to the joint classification model; generating a joint classification output using the joint classification model; and controlling access to a secure asset using the joint classification output.

DETAILED DESCRIPTION

Face verification is an important aspect in almost any modern face recognition system. Face verification can compute one-to-one similarity between the probe and gallery to determine whether the two images are of the same subject, where the gallery information can be obtained through a face classification pipeline (one-to-many).

The verification may not be carried out on the pixel level between probe and gallery due to the fact that there are too many variations and nuisances within raw face images. Instead, high-level features from face images are extracted through either conventional methods, such as HOG, SIFT, etc., or a more advanced and data driven neural network approach, such as Dlib, Arcface, etc. The verification can then be conducted among the face feature vectors using similarity metrics such as Euclidean distance or cosine similarity.

Although the high-level face feature embeddings can provide a simplified way to perform face verification, the present inventors have recognized that there are still limitations associated with the embedding vectors that can sometimes lead to verification failures. The limitations mainly come from the aspects described below.

The neural network that can be used for feature extraction can rely heavily on the quality of the generated face embeddings that rule the performance of the verification. Meanwhile, the neural network's performance can be affected by many factors, such as training dataset, network design, and loss function.

In terms of a training dataset, most publicly available face image datasets have many issues in demographic bias. For example, the ethnic groups across the training identities are often imbalanced, where the majority of the identities fall under one ethnic group. For example, face image datasets like VGGFace, MS-celeb-1M, and Youtube Face have a majority of Caucasian identities, whereas CASIA has a majority of Eastern-Asian identities. The imbalance of ethnic groups can cause the performance of neural networks to favor one ethnic group, thus leading to negative impacts on verification performance for the other ethnic groups.

In addition to ethnicity, the age variations among the training dataset can also introduce bias towards particular age groups, depending on how the collection process was conducted. This age bias can result in performance bias for the trained neural networks.

In addition to ethnicity and age, gender imbalance is a concern. Gender imbalance can usually be controlled when constructing the list for training identities based on public information, but it may not be perfect if assessment is not carried out carefully during the collection.

Finally, large face pose variance can be another cause of the verification failure. Comparing two profile face images for verification purposes is a more difficult task, even from a human perspective.

This disclosure describes various techniques to overcome the problems identified above. The present inventors have recognized the need to construct a new feature representation from multimodal face attributes. The new feature representation can be a combination of one or more face attributes such as age, gender and ethnicity, as will be described in more detail below.

In addition to describing the use of multimodal face attributes in facial recognition systems, this disclosure describes using one or more auxiliary attributes, such as a temporal attribute, that can be used in combination with visual information to improve the face identification performance of the facial recognition system. In some examples, the use of multimodal face attributes in facial recognition systems can be combined with the use of one or more auxiliary attributes, such as a temporal attribute. Each of these techniques can improve the verification performance of the facial recognition system.

A modern face recognition system in an unconstrained environment attempts to accomplish two tasks: 1) face classification (1 vs. N), which attempts to match a query face image to the most similar face in an existing gallery database gathered through enrollment; and 2) face verification (1 vs. 1) which attempts to determine whether the query image and the most similar gallery image are the same person or not. Both processes rely heavily rely on the face embeddings acquired through a face feature extraction pipeline that ranges from a traditional image feature extractor designed manually to neural networks.

As the process suggests, the effectiveness of the face verification depends somewhat on the performance of face classification. To accomplish better matching, machine learning methods such as linear classifier, such as SVM or Logistic Regression, or decision trees, such as XGboost or LightGBM, can be leveraged. The idea is to train a classification model on face embeddings extracted from an enrollment face database to get a better understanding of the target group. In some examples, each identity will enroll a small amount of their face images with high quality and controlled variation.

FIG. 1 is a conceptual diagram illustrating an example of a facial recognition system 10 that uses multimodal face attributes. To identify a person 12, a face or facial recognition network 14 can generate a face embedding 16 from a first representation of a first image of the person, such as a first template, first vector, or a first image. The face embedding 16 can include numerical vectors that can represent each detected face in a representation of an image, such as in a 1024-dimensional space.

In some examples, a machine learning model or neural network can be used to generate the face embedding. As an example, a neural network such as ArcFace can be used to generate the face embedding. For example, the pretrained weights of the neural network can be converted from the open-sourced deepinsight/insightface git repository, which can be trained with LResNet50E-IR network architecture and ArcFace loss function.

Using various techniques of this disclosure, a computer-implemented method can construct a new feature representation from multimodal face attributes. The new feature representation can be used to train a binary classifier for face verification purposes. The new feature representation can be a combination of multiple face attributes such as age, gender and ethnicity.

For example, the computer-implemented method can extract one or more attributes of the person 12 by applying the first representation of the first image of the person to a previously trained attribute classifier machine learning model. The attributes can include, for example, age, gender, ethnicity, and/or head pose, of the person. For example, a face embedding can generate a vector that is applied to one or more previously trained attribute classifier machine learning models, and then each model can extract its particular corresponding attribute. In another example, one or more previously trained attribute classifier machine learning models can each receive raw images as input, generate a feature, and then extract a corresponding attribute.

By way of a non-limiting specific example, the method can use inferred age scores in 5 categories, such as 15-20, 25-32, 38-43, 48-53, and 60+; inferred gender scores in 2 categories: male, female; inferred ethnicity scores in 5 categories: Asian-Indian, Asian-Eastern, African American, Caucasian, and Hispanic; and estimated head's pitch, yaw and roll angles for the head pose of the person.

The previously trained attribute classifier machine learning model(s) can form a part of a verification engine 18. An age classifier machine learning model 20 can extract an age of the person 12 from a representation of an image of the person. Similarly, a gender classifier machine learning model 22 can extract a gender of the person 12. An ethnicity classifier machine learning model 24 can extract an ethnicity of the person 12. A head pose classifier machine learning model 26 can extract a head pose, such as pitch, yaw & roll angles, of the person 12.

In addition, the computer-implemented method can obtain a distance measurement using a second representation of a second image of the person, such as a second template, second vector, or a second image. In some examples, the first template can be the same as the second template. In some examples, the first template can be different than the second template. In some examples, the first image can be the same as the second image. In some examples, the first image can be different than the second image, such as taken at a different angle.

The distance measurement classifier 28 of the verification engine 18 can compare two vectors from two embeddings, such as templates. For example, the distance measurement classifier 28 can compare a vector from a face embedding presented to a reader, for example, to a vector from a face embedding of the person 12 that was acquired at the scene, such as by a camera. These two vectors are represented by the bottom input 30 to the distance measurement classifier 28.

In some examples, the distance measurement classifier 28 can alternatively compare a vector from a face embedding presented to a reader or camera, for example, to a vector from a face embedding of a person found during a search of images in a database. For example, a classification pipeline 32, such as a previously trained machine learning model or an algorithm, can perform a search of the most similar templates in a template database. The output of the classification pipeline 32 can include the most similar template. Then, the computer-implemented method can perform a verification of the images using, for example, a centroid lookup 34.

The distance measurement classifier 28 of the verification engine 18 can compare a vector from a face embedding presented to a reader or camera, for example, to a vector from a face embedding of the most similar image found during using the classification pipeline 32 and centroid lookup 34. These two vectors are represented by the top input 36 to the distance measurement classifier 28. In some examples, the distance measure classifier 28 can use both inputs 30, 36.

The output 38 of the distance measurement classifier 28 can be a mathematical value resulting from the comparison of the two vectors. In some examples, the distance measurement classifier 28 can be a previously trained machine learning model. In other examples, the distance measurement classifier 28 can be an algorithm.

Each of the previously trained attribute classifier machine learning models 20-26 can generate a corresponding attribute classifier output 40-46. Using the techniques of this disclosure, one or more of the attribute classifier outputs 40-46 can be applied with a distance measurement output 38 to a previously trained fusion verification machine learning model 48. In some examples, the previously trained fusion verification machine learning model 48 can be a binary XGBoost classifier built from decision trees.

By fusing or combining the distance measurement output 38 with the one or more one or more attribute classifier outputs 40-46, the previously trained fusion verification machine learning model 48 can improve the verification performance of the facial recognition system.

The computer-implemented method can generate a facial recognition system output 50 using the previously trained fusion verification machine learning model 48 that can, for example, control access to a secure asset, such as a room, building, or a computer system.

The verification engine 18 can be a computer program. The verification engine 18, the previously trained machine learning models, and any algorithms described in this disclosure can be implemented using the machine 300 of FIG. 6. For example, one or more of the verification engine 18, the machine learning models 20-26, and the machine learning model 48 can be implemented using instructions 324 that are executed by the processor 302. The verification engine and the machine learning models can be co-located on one machine or located in different machines.

The present inventors evaluated the techniques of FIG. 1, and the results are shown below in Table 1. Table 1 shows verification results to demonstrate the performance of new feature representation fused from multimodal face attributes:

TABLE 1

| Model ID | Similarity measure | Age | Gender | Ethnicity | Yaw angle | Accuracy mean | Accuracy std |
|---|---|---|---|---|---|---|---|
| C1 | 1 | 1 | 1 | 1 | 1 | 0.9833 | 0.0001 |
| C2 | 1 | 1 | 1 | 1 | 0 | 0.9826 | 0.0007 |
| C3 | 1 | 1 | 1 | 0 | 1 | 0.9786 | 0.0014 |
| C4 | 1 | 1 | 1 | 0 | 0 | 0.9753 | 0.0011 |
| C5 | 1 | 1 | 0 | 1 | 1 | 0.9833 | 0.0006 |
| C6 | 1 | 1 | 0 | 1 | 0 | 0.9820 | 0.0005 |
| C7 | 1 | 1 | 0 | 0 | 1 | 0.9777 | 0.0000 |
| C8 | 1 | 1 | 0 | 0 | 0 | 0.9750 | 0.0014 |
| C9 | 1 | 0 | 1 | 1 | 1 | 0.9827 | 0.0003 |
| C10 | 1 | 0 | 1 | 1 | 0 | 0.9802 | 0.0015 |
| C11 | 1 | 0 | 1 | 0 | 1 | 0.9777 | 0.0005 |
| C12 | 1 | 0 | 1 | 0 | 0 | 0.9746 | 0.0003 |
| C13 | 1 | 0 | 0 | 1 | 1 | 0.9820 | 0.0009 |
| C14 | 1 | 0 | 0 | 1 | 0 | 0.9822 | 0.0011 |
| C15 | 1 | 0 | 0 | 0 | 1 | 0.9788 | 0.0008 |
| C16 | 1 | 0 | 0 | 0 | 0 | 0.9751 | 0.0015 |
| C17 | 0 | 1 | 1 | 1 | 1 | 0.7175 | 0.0029 |
| C18 | 0 | 1 | 1 | 1 | 0 | 0.7133 | 0.0024 |
| C19 | 0 | 1 | 1 | 0 | 1 | 0.5669 | 0.0051 |
| C20 | 0 | 1 | 1 | 0 | 0 | 0.5648 | 0.0016 |
| C21 | 0 | 1 | 0 | 1 | 1 | 0.6828 | 0.0002 |
| C22 | 0 | 1 | 0 | 1 | 0 | 0.6829 | 0.0002 |
| C23 | 0 | 1 | 0 | 0 | 1 | 0.5407 | 0.0030 |
| C24 | 0 | 1 | 0 | 0 | 0 | 0.5305 | 0.0023 |
| C25 | 0 | 0 | 1 | 1 | 1 | 0.6119 | 0.0060 |
| C26 | 0 | 0 | 1 | 1 | 0 | 0.6150 | 0.0031 |
| C27 | 0 | 0 | 1 | 0 | 1 | 0.2123 | 0.0033 |
| C28 | 0 | 0 | 1 | 0 | 0 | 0.5177 | 0.0029 |
| C29 | 0 | 0 | 0 | 1 | 1 | 0.5798 | 0.0068 |
| C30 | 0 | 0 | 0 | 1 | 0 | 0.5821 | 0.0051 |
| C31 | 0 | 0 | 0 | 0 | 1 | 0.2024 | 0.0059 |

The present inventors constructed an exhaustive combination list for all the new feature categories, as shown in Table 1, where "1" indicates that a feature (age, gender, ethnicity, and yaw angle) is used and "0" indicates that the feature was not used. For each combination, an XGBoost classifier was trained using a VGGFace2 test dataset, from which half of the identities were assigned as genuine and the other half were assigned as imposters. The results shown in Table 1 indicate that the verification performance can be improved by using one or more of the available attributes when constructing the new feature representation.

As mentioned above, in addition to using multimodal face attributes in facial recognition systems, this disclosure describes using one or more auxiliary attributes, such as a temporal attribute, that can be used in combination with visual information to improve the face identification performance of the facial recognition system. The use of auxiliary features is shown and described below with respect to FIG. 2.

Several factors can limit the performance of the visual classifier. For example, the face embedding generation neural network is imperfect. Research efforts are being made into developing a state-of-art face feature extraction method, as it plays an important role in the entire face recognition pipeline. Although the performance of neural networks has achieved a very high level, there is still no solution to accomplish perfect face recognition on a large scale and custom dataset. Further, in an unconstrained imaging environment, the variation of the query images also affects the matching performance. Some of the most common nuances were described above, including face pose angle, age variance, ethnicity, or query image quality.

In light of the above, the present inventors have recognized the need for a new architecture that combines visual and auxiliary attribute(s), such as temporal information, for improved face identification performance, shown and described below in FIG. 2.

Figure 2:
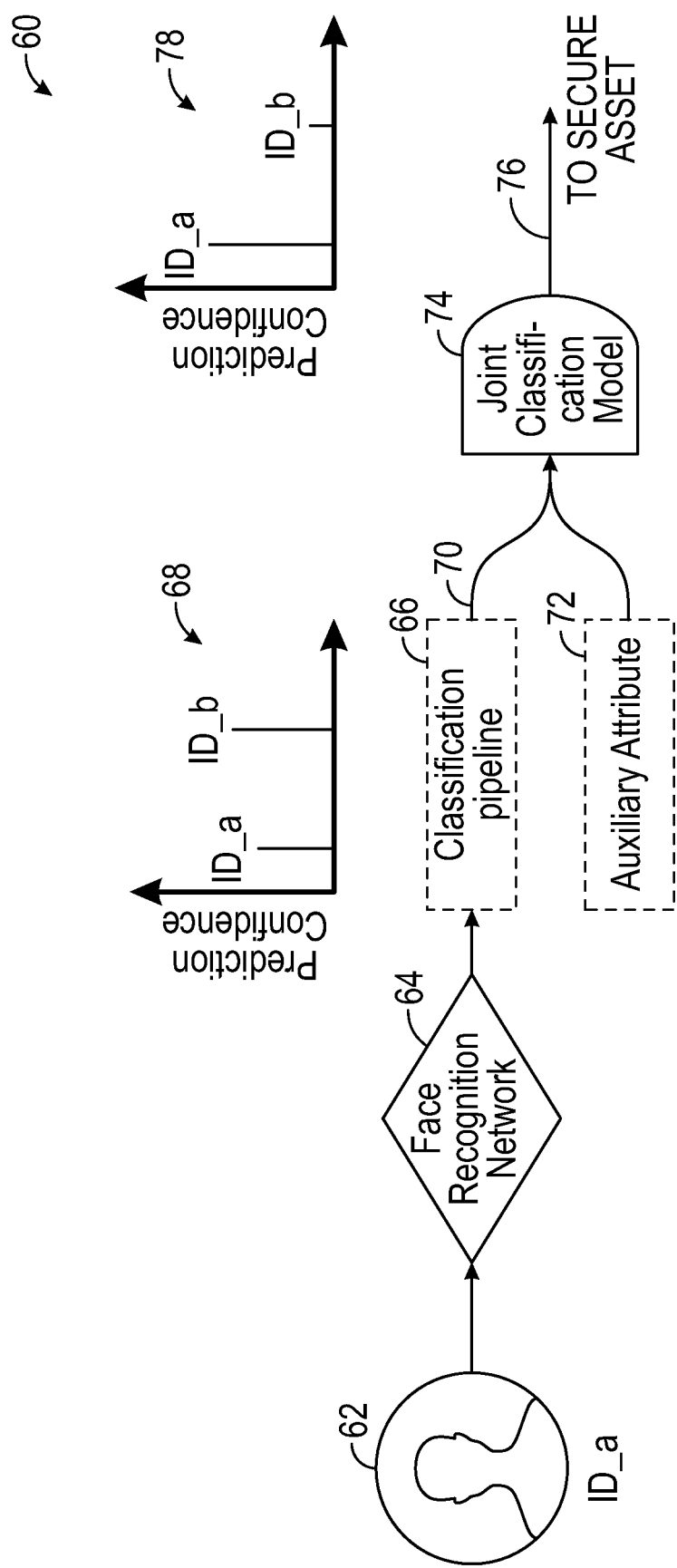
FIG. 2 is a conceptual diagram illustrating an example of a facial recognition system that uses one or more auxiliary attributes that can be used in combination with visual information to improve the face identification performance.

FIG. 2 is a conceptual diagram illustrating an example of a facial recognition system 60 that uses one or more auxiliary attributes that can be used in combination with visual information to improve the face identification performance. FIG. 2 conceptually depicts a computer-implemented method of using a facial recognition system to identify a person from an image of the person. As described below, when a visual classifier predicts multiple candidates with close confidence level, auxiliary attribute(s), such as temporal information, can be used to re-rank the prediction for better identification. The techniques of FIG. 2 can improve face classification (1 vs. N) accuracy.

To identify a person 62 (ID_a), a facial recognition network 64 can generate or perform a face embedding from a first representation of a first image of the person, such as a first template, first vector, or a first image. The face embedding can include numerical vectors that can represent each detected face in a representation of an image, such as in a 1024-dimensional space.

The face embedding, e.g., vectors, generated by the face recognition network can then be applied to a classification pipeline 66. For example, the classification pipeline 66, such as a previously trained machine learning model or an algorithm, can perform a search of the most similar templates in a template database. The output of the classification pipeline 66 can include the most similar template. In the example shown in FIG. 2, the most similar template found by the classification pipeline is template ID_b, shown at 68. The classification pipeline 66 in FIG. 2 determined that it has a higher prediction confidence in template ID_b than in template ID_a for the person 62 (ID_a).

The classification pipeline 66 can generate a classification pipeline output 70 based on the identified image. In some examples, the classification pipeline output 70 can include a distance measurement. In other examples, the classification pipeline output 70 can include a score or probability of match per enrolled identity in the system.

For example, the classification pipeline 66 can include a distance measurement classifier, such as described above with respect to FIG. 1 that can compare two vectors from two embeddings, such as templates. In some examples, the distance measurement classifier can compare a vector from a face embedding presented to a reader or camera, for example, to a vector from a face embedding of the most similar image found during using the classification pipeline and centroid lookup.

The output of the distance measurement classifier, which can also be the output of the classification pipeline 66, can be a mathematical value resulting from the comparison of the two vectors. In some examples, the distance measurement classifier can be a previously trained machine learning model. In other examples, the distance measurement classifier can be an algorithm.

Using various techniques of this disclosure, an auxiliary attribute 72 can be used in combination with the visual information obtained via the classification pipeline 66 to improve the face identification performance of the facial recognition system 60. The auxiliary attribute 72 can include temporal information, a height of the person 62, and/or a social pooling of the person 62, among other things.

The temporal information can include, for example, a time range of when the person 62 typically arrives at the facial recognition system, such as at a secured entrance, e.g., a door, to a building. A machine learning model can learn this time range of the person 62 over time. In some examples, machine learning model can learn a particular, secured entrance, e.g., door, to the building that the person 62 uses, if there are multiple secured entrances. Then, using various techniques of this disclosure, the temporal information, or other auxiliary attribute can be applied along with the classification pipeline output 70 to a joint classification model 74.

By way of a non-limiting specific example for purposes of illustration, a machine learning model of the facial recognition system 60 previously determined that the person 62 regularly arrives at a secured entrance to a building between 6:00 AM-6:15 AM. This temporal information, or other auxiliary attribute(s), can be applied to the joint classification model 74 with the classification pipeline output 70 to improve the face identification performance of the facial recognition system 60. The classification pipeline 66 initially determined a higher prediction confidence in template ID_b than in template ID_a for the person 62 (ID_a), as shown at 68 in FIG. 2. However, the person associated with template ID_b regularly arrives at the secured entrance between 9:00 AM-9:15 AM and the current time is 6:10 AM. As such, the person 62 is more likely to be associated with template ID_a, not template ID_b.

By using the temporal information, for example, the facial recognition system 60 and, more particularly, the joint classification model 74 can generate a joint classification output 76 using the joint classification model 74 that determines a higher prediction confidence in template ID_a than in template ID_b for the person 62 (ID_a), as shown at 78 in FIG. 2. Then, the computer-implemented method can control access to a secure asset using the joint classification output 76.

Temporal information is one auxiliary attribute that can be used. In other examples, a height of an individual can be used. In other examples, a dress attire of an individual can be used. In other examples, a gait of an individual can be used. Machine learning models can be trained to classify height, dress attire, and gait of individuals.

In some examples, a social pooling of the person 62 can be used. A social pooling can include information about a network of people with whom the person 62 associates. For example, the social pooling of the person 62 can include people with whom the person 62 leaves work, arrives to work, goes to lunch, and the like. A machine learning model can learn the identities of these individuals over time to determine the social pooling of the person 62. When the person 62 arrives at a secured entrance, for example, the previously trained machine learning model can determine a prediction confidence for one or more individuals with the person 62, compare that prediction confidence to the social pooling of person 62, and apply the social and the classification pipeline output 70 to the joint classification model 74 to improve the face identification performance of the facial recognition system 60.

In some examples, the facial recognition system 60 can generate the joint classification output 70 by generating a joint probability using the joint classification model 74. For example, a joint probability based on the two inputs to the joint classification model 74 can be determined using Bayesian Theory:

$$Pr(\text{query} = \text{gallery}_n \mid v, t) = $$
$$\frac{Pr(v, t \mid \text{query} = \text{gallery}_n) Pr(\text{query} = \text{gallery}_n)}{Pr(v, t)} = $$
$$\frac{Pr(v \mid \text{query} = \text{gallery}_n) Pr(t \mid \text{query} = \text{gallery}_n) Pr(\text{query} = \text{gallery}_n)}{Pr(v) P(t)} = $$
$$\frac{Pr(\text{query} = \text{gallery}_n \mid v) Pr(t \mid \text{query} = \text{gallery}_n)}{Pr(t)} \quad \text{Equation 1}$$

$$\propto Pr(\text{query} = \text{gallery}_n \mid v) Pr(t \mid \text{query} = \text{gallery}_n) \quad \text{Equation 2}$$

The equations above indicate that the matching probability of a query face and each face in the enrollment gallery using visual and temporal information jointly (Pr(query=gallery$_n$|v,t)) (Equation 1), is proportional to the multiplication of matching probability from the visual classifier trained on visual features (Pr(query=gallery$_n$|v)) and the probability of the predicted person arriving at the gateway or entrance at one timestamp (Pr(t|query=gallery$_n$)) (Equation 2).

In this manner, a combination of visual information and an auxiliary attribute can be used to improve the face identification performance of the facial recognition system.

Figure 3:
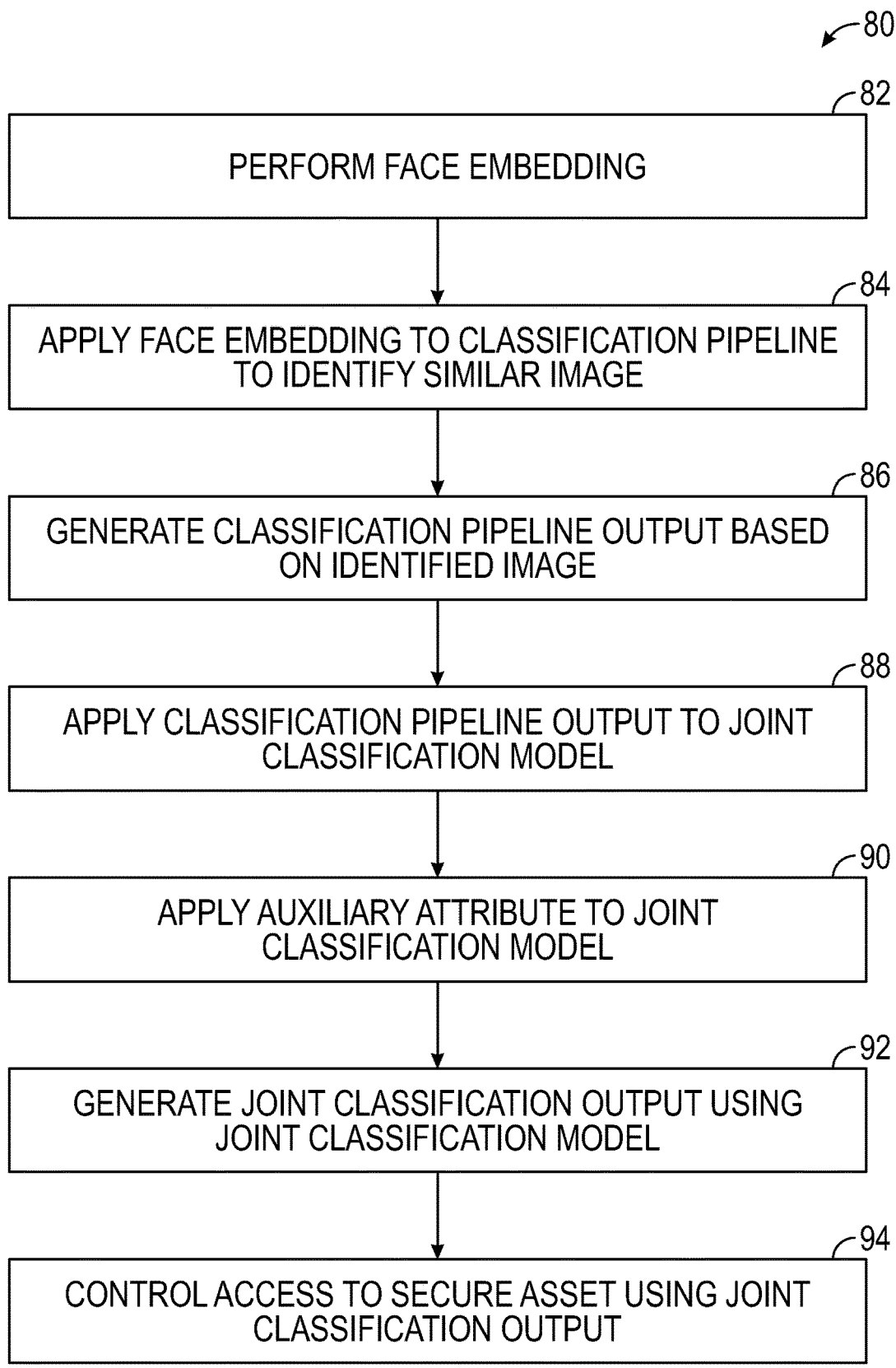
FIG. 3 is a flowchart of an example of a computer-implemented method of using one or more auxiliary attributes that can be used in combination with visual information to improve the face identification performance of the facial recognition system, such as was described above with respect to FIG. 2.

FIG. 3 is a flowchart of an example of a computer-implemented method 80 of using one or more auxiliary attributes that can be used in combination with visual information to improve the face identification performance of the facial recognition system, such as was described above with respect to FIG. 2.

At block 82, the computer-implemented method 80 can perform a face embedding. For example, a facial recognition network, such as the facial recognition network 60 of FIG. 2, can generate or perform a face embedding from a first representation of a first image of the person, such as a first template, first vector, or a first image.

At block 84, the computer-implemented method 80 can apply the face embedding to a classification pipeline to identify a similar image. For example, the face embedding, e.g., vectors, generated by the face recognition network can be applied to a classification pipeline, such as the classification pipeline 66 of FIG. 2.

At block 86, the computer-implemented method 80 can generate a classification pipeline output based on the identified image. For example, the classification pipeline 66 of FIG. 2, such as a previously trained machine learning model or an algorithm, can perform a search of the most similar templates in a template database and output the most similar template. In some examples, the classification pipeline output 70 of FIG. 2 can be a distance measurement.

At block 88, the computer-implemented method 80 can apply the classification pipeline output to a joint classification model. For example, a classification pipeline output, such as the classification pipeline output 70 of FIG. 2, can be applied to a joint classification model, such as the joint classification model 74 of FIG. 2, which can compute a joint probability using Bayesian Theory.

At block 90, the computer-implemented method 80 can apply an auxiliary attribute to the joint classification model. For example, temporal information, or other auxiliary attribute, can be applied to a joint classification model, such as the joint classification model 74 of FIG. 2.

At block 92, the computer-implemented method 80 can generate a joint classification output using the joint classification model.

At block 94, the computer-implemented method 80 can control access to a secure asset using the joint classification output. For example, the joint classification output 76 of FIG. 2 can be used to control access to a room, building, or a computer system, such as by providing a control signal to a control system in communication with the secure asset.

Figure 4:
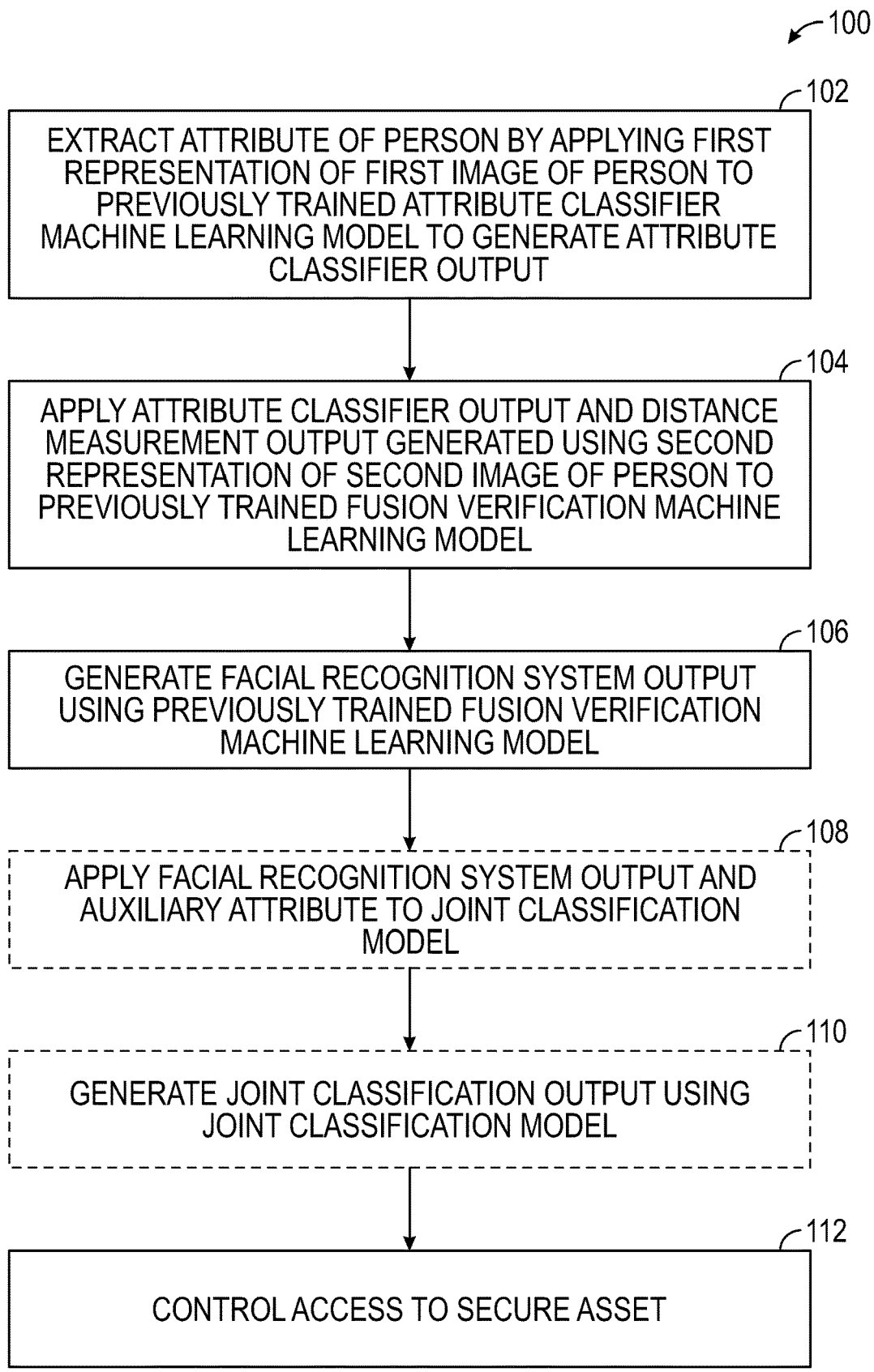
FIG. 4 is a flowchart of an example of a computer-implemented method 100 of using multimodal face attributes in a facial recognition system to improve the face identification performance of the facial recognition system, such as was described above with respect to FIG. 1.

FIG. 4 is a flowchart of an example of a computer-implemented method 100 of using multimodal face attributes in a facial recognition system to improve the face identification performance of the facial recognition system, such as was described above with respect to FIG. 1.

At block 102, the computer-implemented method 100 can extract an attribute of the person, such as age, gender, ethnicity, and head pose, by applying a first representation of a first image of the person, such as a first template, first vector, or a first image, to a previously trained attribute classifier machine learning model to generate an attribute classifier output. For example, one or more attributes, such as age, gender, ethnicity, and/or head pose, of the person, can be extracted using corresponding previously trained attribute classifier machine learning models 20-26 of FIG. 1.

In some examples, a face embedding can generate a vector that is applied to one or more previously trained attribute classifier machine learning models, and then each model can extract its particular corresponding attribute. In other examples, one or more previously trained attribute classifier machine learning models can each receive raw images as input, generate a feature, and then extract a corresponding attribute.

At block 104, the computer-implemented method 100 can apply the attribute classifier output and a distance measurement output generated using a second representation of a second image of the person, such as a second template, second vector, or a second image to a previously trained fusion verification machine learning model. For example, one or more of the attribute classifier outputs 40-46 of FIG. 1 and an output 38 of the distance measurement classifier 28 of FIG. 1 can be applied to the previously trained fusion verification machine learning model 48 of FIG. 1.

At block 106, the computer-implemented method 100 can generate a facial recognition system output using the previously trained fusion verification machine learning model. For example, the previously trained fusion verification machine learning model 48 of FIG. 1 can generate a facial recognition system output 50.

In some examples, the use of multimodal face attributes in facial recognition systems can be combined with the use of one or more auxiliary attributes, such as a temporal attribute. Each of these techniques can improve the verification performance of the facial recognition system. That is, in some examples, the techniques of FIG. 2 can be optionally be combined with the techniques of FIG. 1. These optional techniques are shown at blocks 108 and 110 in FIG. 4.

At block 108, the computer-implemented method 100 can optionally apply the facial recognition system output and an auxiliary attribute to a joint classification model. For example, the facial recognition system output 50 of FIG. 1 can be applied with an auxiliary attribute, such as temporal information, to the joint classification model 74 of FIG. 2.

At block 110, the computer-implemented method 100 can optionally generate a joint classification output using the joint classification model, such as the joint classification model 74 of FIG. 2.

At block 112, the computer-implemented method 100 can control access to a secure asset using the joint classification output or using the facial recognition system output 50 if an auxiliary attribute is not used. For example, the joint classification output 74 can be used to control access to a room, building, or a computer system, such as by providing a control signal to a control system in communication with the secure asset.

Figure 5:
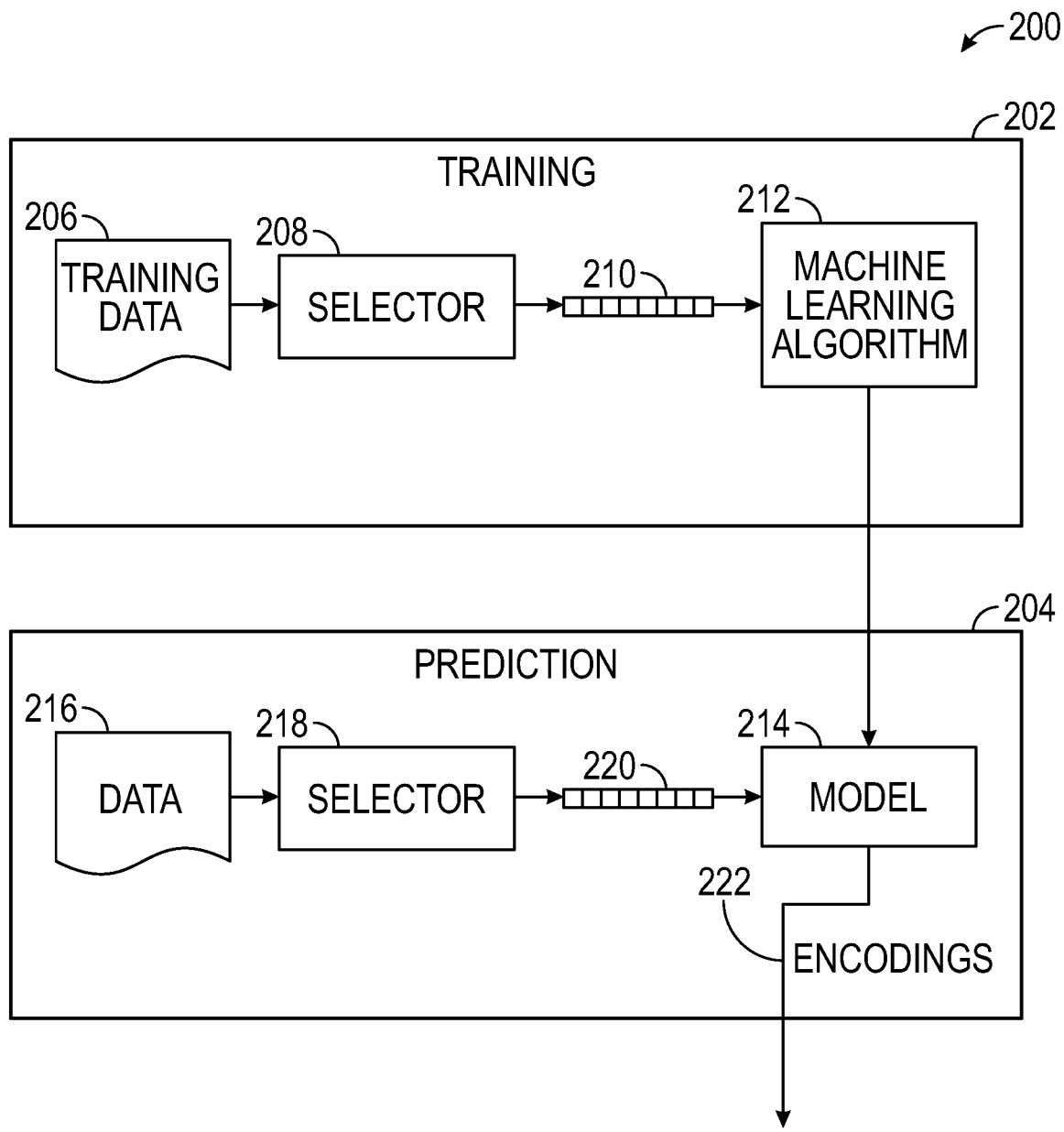
FIG. 5 shows an example machine learning module 200 according to some examples of the present disclosure.

FIG. 5 shows an example machine learning module 200 according to some examples of the present disclosure. The machine learning module 200 can be implemented in whole or in part by one or more computing devices. In some examples, a training module 202 can be implemented by a different device than a prediction module 204. In these examples, the model 214 can be created on a first machine and then sent to a second machine.

The machine learning module 200 utilizes a training module 202 and a prediction module 204. The training module 202 can implement a computerized method of training processing circuitry, such as the processor 302 of FIG. 6, using machine learning in a facial recognition system to identify a person. The training module 202 inputs training data 206 into a selector module 208.

The training data 206 can include, for example, images or the feature vectors generated by the feature extractor network. Using this training data 206, the machine learning algorithm 212 can get the images or feature vectors with the desired label (e.g., age, gender, etc.) for each sample and pass it through a machine learning algorithm, such as SVM, XBoost.

In some examples, the training data 206 can be labeled. In other examples, the training data may not be labeled, and the model can be trained using feedback data—such as through a reinforcement learning method.

The selector module 208 selects a training vector 210 from the training data 206. The selected data can fill the training vector 210 and includes a set of the training data that is determined to be predictive of a material classification. Information chosen for inclusion in the training vector 210 can be all the training data 206 or in some examples, can be a subset of all the training data 206. The training vector 210 can be utilized (along with any applicable labels) by the machine learning algorithm 212 to produce a model 214 (a trained machine learning model). In some examples, other data structures other than vectors can be used. The machine learning algorithm 212 can learn one or more layers of a model.

Example layers can include convolutional layers, dropout layers, pooling/up sampling layers, SoftMax layers, and the like. Example models can be a neural network, where each layer is comprised of a plurality of neurons that take a plurality of inputs, weight the inputs, input the weighted inputs into an activation function to produce an output which can then be sent to another layer. Example activation functions can include a Rectified Linear Unit (ReLu), and the like. Layers of the model can be fully or partially connected.

In the prediction module 204, data 216 can be input to the selector module 218. The data 216 can include an acoustic imaging data set, such as an S-matrix. The selector module 218 can operate the same, or differently than the selector module 208 of the training module 202. In some examples, the selector modules 208 and 218 are the same modules or different instances of the same module. The selector module 218 produces a vector 220, which is input into the model 214 to generate an image of the material depicting a probability of a flaw per pixel or voxel, resulting in an image 222.

For example, the weightings and/or network structure learned by the training module 202 can be executed on the vector 220 by applying vector 220 to a first layer of the model 214 to produce inputs to a second layer of the model 214, and so on until the material classification is output. As previously noted, other data structures can be used other than a vector (e.g., a matrix).

The training module 202 can operate in an offline manner to train the model 214. The prediction module 204, however, can be designed to operate in an online manner. It should be noted that the model 214 can be periodically updated via additional training and/or user feedback. For example, additional training data 206 can be collected as users provide feedback on age, gender, ethnicity, head pose, etc., and/or auxiliary attributes such as temporal information. The feedback, along with the data 216 corresponding to that feedback, can be used to refine the model by the training module 202.

The machine learning algorithm 212 can be selected from among many different potential supervised or unsupervised machine learning algorithms. Examples of learning algorithms include artificial neural networks, convolutional neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, a region based CNN, a full CNN (for semantic segmentation), a mask R-CNN algorithm for instance segmentation, and hidden Markov models. Examples of unsupervised learning algorithms include expectation-maximization algorithms, vector quantization, and information bottleneck method.

In this manner, the machine learning module 200 of FIG. 5 can assist in implementing a computerized method of using a facial recognition system to identify a person, in accordance with this disclosure.

The techniques shown and described in this document can be performed using a portion or an entirety of a machine 300 as discussed below in relation to FIG. 6.

Figure 6:
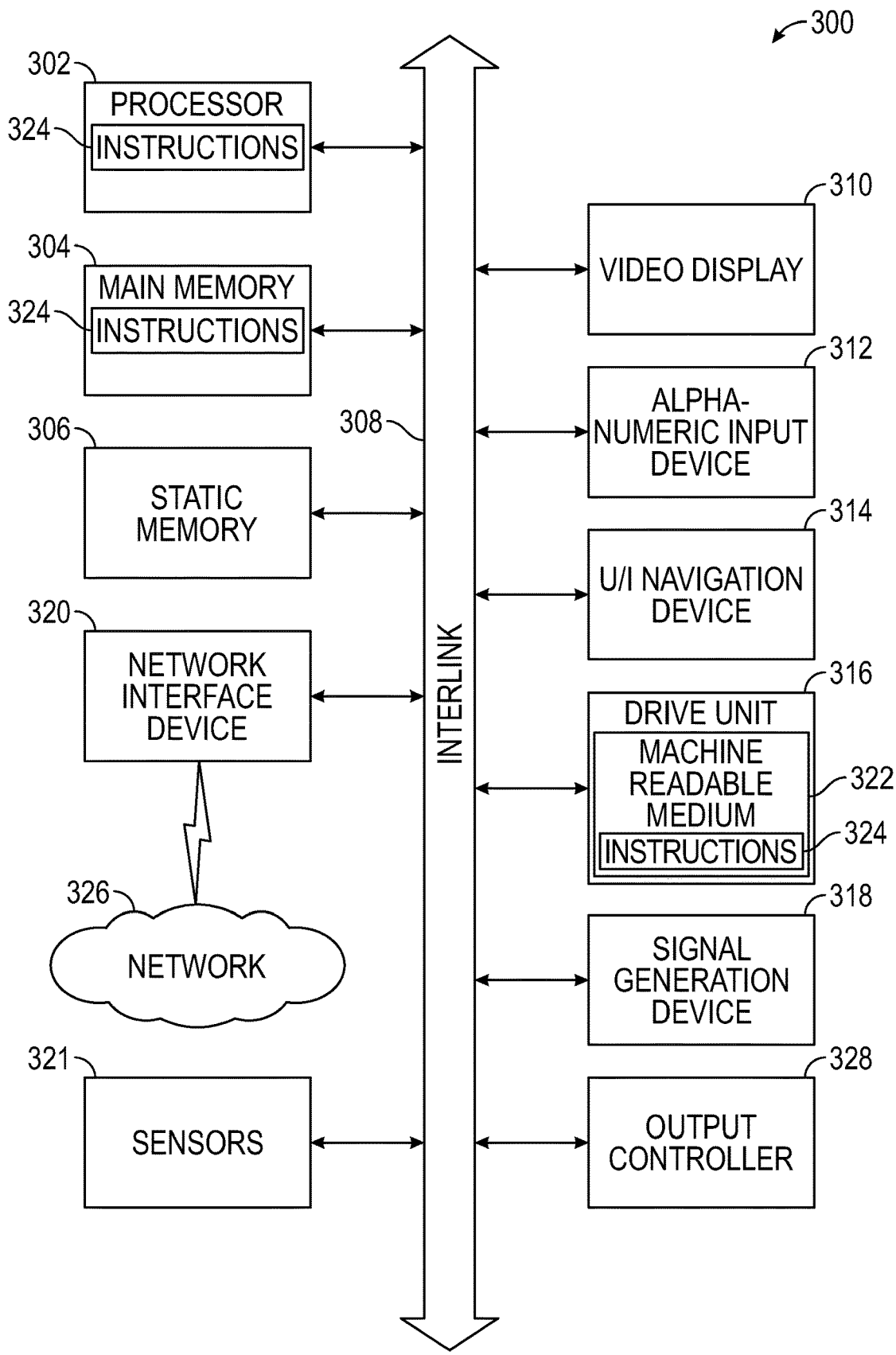
FIG. 6 illustrates a block diagram of an example machine upon which any one or more of the techniques (e.g., methodologies) discussed herein can perform.

FIG. 6 illustrates a block diagram of an example of a machine upon which any one or more of the techniques (e.g., methodologies) discussed herein can perform. In alternative embodiments, the machine 300 can operate as a standalone device or are connected (e.g., networked) to other machines. In a networked deployment, the machine 300 can operate in the capacity of a server machine, a client machine, or both in server-client network environments. In an example, the machine 300 can act as a peer machine in peer-to-peer (P2P) (or other distributed) network environment. The machine 300 is a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. In various embodiments, machine 300 can perform one or more of the processes described above. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms (all referred to hereinafter as "modules"). Modules are tangible entities (e.g., hardware) capable of performing specified operations and is configured or arranged in a certain manner. In an example, circuits are arranged (e.g., internally or with respect to external entities such as other circuits) in a specified manner as a module. In an example, the whole or part of one or more computer systems (e.g., a standalone, client or server computer system) or one or more hardware processors are configured by firmware or software (e.g., instructions, an application portion, or an application) as a module that operates to perform specified operations. In an example, the software can reside on a non-transitory computer readable storage medium or other machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor is configured as respective different modules at different times. Software can accordingly configure a hardware processor, for example, to constitute a particular module at one instance of time and to constitute a different module at a different instance of time.

Machine (e.g., computer system) 300 can include a hardware processor 302 (e.g., a central processing unit (CPU), a graphics processing unit (GPU), a hardware processor core, or any combination thereof), a main memory 304, and a static memory 306, some or all of which can communicate with each other via an interlink 308 (e.g., bus). The machine 300 can further include a display unit 310, an alphanumeric input device 312 (e.g., a keyboard), and a user interface (UI) navigation device 314 (e.g., a mouse). In an example, the display unit 310, input device 312 and UI navigation device 314 are a touch screen display. The machine 300 can additionally include a storage device (e.g., drive unit) 316, a signal generation device 318 (e.g., a speaker), a network interface device 320, and one or more sensors 321, such as a global positioning system (GPS) sensor, compass, accelerometer, or other sensor. The machine 300 can include an output controller 328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 316 can include a machine readable medium 322 on which is stored one or more sets of data structures or instructions 324 (e.g., software) embodying or utilized by any one or more of the techniques or functions described herein. The instructions 324 can also reside, completely or at least partially, within the main memory 304, within static memory 306, or within the hardware processor 302 during execution thereof by the machine 300. In an example, one or any combination of the hardware processor 302, the main memory 304, the static memory 306, or the storage device 316 can constitute machine readable media.

While the machine readable medium 322 is illustrated as a single medium, the term "machine readable medium" can include a single medium or multiple media (e.g., a centralized or distributed database, and/or associated caches and servers) configured to store the one or more instructions 324.

The term "machine readable medium" can include any medium that is capable of storing, encoding, or carrying instructions for execution by the machine 300 and that cause the machine 300 to perform any one or more of the techniques of the present disclosure, or that is capable of storing, encoding or carrying data structures used by or associated with such instructions. Non-limiting machine readable medium examples can include solid-state memories, and optical and magnetic media. Specific examples of machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media can include non-transitory machine readable media. In some examples, machine readable media can include machine readable media that is not a transitory propagating signal.

The instructions 324 can further be transmitted or received over a communications network 326 using a transmission medium via the network interface device 320. The machine 300 can communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 320 can include one or more physical jacks (e.g., Ethernet, coaxial, or phone jacks) or one or more antennas to connect to the communications network 326. In an example, the network interface device 320 can include a plurality of antennas to wirelessly communicate using at least one of single-input multiple-output (SIMO), multiple-input multiple-output (MIMO), or multiple-input single-output (MISO) techniques. In some examples, the network interface device 320 can wirelessly communicate using Multiple User MIMO techniques.

Examples, as described herein, can include, or can operate on, logic or a number of components, modules, or mechanisms. Modules are tangible entities (e.g., hardware) capable of performing specified operations and are configured or arranged in a certain manner. In an example, circuits are arranged (e.g., internally or with respect to external entities such as other circuits) in a specified manner as a module. In an example, the whole or part of one or more computer systems (e.g., a standalone, client, or server computer system) or one or more hardware processors are configured by firmware or software (e.g., instructions, an application portion, or an application) as a module that operates to perform specified operations. In an example, the software can reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor is configured as respective different modules at different times. Software can accordingly configure a hardware processor, for example, to constitute a particular module at one instance of time and to constitute a different module at a different instance of time.

Various embodiments are implemented fully or partially in software and/or firmware. This software and/or firmware can take the form of instructions contained in or on a non-transitory computer-readable storage medium. Those instructions can then be read and executed by one or more processors to enable performance of the operations described herein. The instructions are in any suitable form, such as but not limited to source code, compiled code, interpreted code, executable code, static code, dynamic code, and the like. Such a computer-readable medium can include any tangible non-transitory medium for storing information in a form readable by one or more computers, such as but not limited to read only memory (ROM); random access memory (RAM); magnetic disk storage media; optical storage media; flash memory; etc.

Various Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The above description is intended to be illustrative, and not restrictive. For example, the above-described examples (or one or more aspects thereof) can be used in combination with each other. Other embodiments can be used, such as by one of ordinary skill in the art upon reviewing the above description. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment.

The claimed invention is:

1. A computer-implemented method of using a facial recognition system to identify a person, the method comprising:

extracting an attribute of the person by applying a first representation of a first image of the person to a previously trained attribute classifier machine learning model to generate an attribute classifier output;

applying the attribute classifier output and a distance measurement output generated using a second representation of a second image of the person to a previously trained fusion verification machine learning model;

generating a facial recognition system output using the previously trained fusion verification machine learning model;

applying the facial recognition system output to a joint classification model;

applying an auxiliary attribute to the joint classification model;

generating a joint classification output using the joint classification model; and controlling access to a secure asset using the joint classification output.

2. The method of claim 1, wherein the attribute is a first attribute, wherein the previously trained attribute classifier machine learning model is a previously trained first attribute classifier machine learning model, and wherein the attribute classifier output is a first attribute classifier output, the method comprising:

extracting a second attribute by applying the first representation of the first image to a previously trained second attribute classifier machine learning model to generate a second attribute classifier output; and applying the second attribute classifier output to the previously trained fusion verification machine learning model.

3. The method of claim 1, wherein the attribute includes at least one of age, gender, ethnicity, or head angle.

4. The method of claim 1, wherein the first representation of the image includes at least one vector.

5. The method of claim 1, wherein the distance measurement output is generated by applying a first distance measurement to a distance measurement classifier, the method comprising:

performing a face embedding;

applying the face embedding to a classification pipeline to identify a similar image;

generating a second distance measurement from the identified image; and applying the second distance measurement to the distance measurement classifier to generate the distance measurement output.

6. The method of claim 1, wherein the auxiliary attribute includes a temporal attribute.

7. The method of claim 1, wherein the auxiliary attribute includes social pooling of the person.

8. The method of claim 1, wherein the auxiliary attribute includes a height of the person.

9. The method of claim 1, wherein the first representation of the image is the same as the second representation of the image.

10. The method of claim 1, wherein the first image is the same as the second image.

11. The method of claim 1, wherein controlling access to a secure asset using the joint classification output includes controlling access to a secured entrance to a building.

12. A computer-implemented method of using a facial recognition system to identify a person from an image of the person, the method comprising:
   performing a face embedding;
   applying the face embedding to a classification pipeline to identify a similar image;
   generating a classification pipeline output based on the identified image;
   applying the classification pipeline output to a joint classification model;
   applying an auxiliary attribute to the joint classification model;
   generating a joint classification output using the joint classification model; and
   controlling access to a secure asset using the joint classification output.

13. The method of claim 12, wherein the classification pipeline output includes a distance measurement.

14. The method of claim 12, wherein the auxiliary attribute includes a temporal attribute.

15. The method of claim 12, wherein the auxiliary attribute includes social pooling of the person.

16. The method of claim 12, wherein the auxiliary attribute includes a height of the person.

17. The method of claim 12, wherein the joint classification model includes a previously trained machine learning model.

18. The method of claim 12, wherein generating the joint classification output includes:
   generating a joint probability using the joint classification model.

19. The method of claim 12, wherein controlling access to a secure asset using the facial recognition system output includes controlling access to a secured entrance to a building.

20. The method of claim 1, wherein the fusion verification machine learning model fuses the attribute classifier output and the distance measurement output to obtain a fused feature representation.

\* \* \* \* \*